US008296597B2

United States Patent
Tu

(10) Patent No.: US 8,296,597 B2
(45) Date of Patent: Oct. 23, 2012

(54) COMPUTER SYSTEM CAPABLE OF DYNAMICALLY MODULATING OPERATION VOLTAGE AND FREQUENCY OF CPU

(75) Inventor: Hung-Jan Tu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 393 days.

(21) Appl. No.: 12/539,100

(22) Filed: Aug. 11, 2009

(65) Prior Publication Data

US 2010/0169701 A1    Jul. 1, 2010

(30) Foreign Application Priority Data

Aug. 22, 2008    (TW) ................................ 97132266 A

(51) Int. Cl.
   *G06F 1/26*    (2006.01)
(52) U.S. Cl. ...................... 713/340; 713/300; 713/330
(58) Field of Classification Search .................... 713/300
   See application file for complete search history.

(56) References Cited

U.S. PATENT DOCUMENTS

| | | | | |
|---|---|---|---|---|
| 6,513,124 | B1 * | 1/2003 | Furuichi et al. | 713/322 |
| 6,574,739 | B1 * | 6/2003 | Kung et al. | 713/322 |
| 6,829,713 | B2 * | 12/2004 | Cooper et al. | 713/320 |
| 6,845,456 | B1 * | 1/2005 | Menezes et al. | 713/320 |
| 7,134,030 | B2 * | 11/2006 | Wang | 713/320 |
| 7,222,254 | B2 * | 5/2007 | Kurts et al. | 713/600 |
| 7,254,721 | B1 * | 8/2007 | Tobias et al. | 713/300 |
| 7,337,335 | B2 * | 2/2008 | Jorgenson et al. | 713/300 |
| 7,600,141 | B2 * | 10/2009 | Flynn | 713/322 |
| 7,647,513 | B2 * | 1/2010 | Tobias et al. | 713/300 |
| 7,711,966 | B2 * | 5/2010 | Prabhakaran et al. | 713/300 |
| 7,779,279 | B2 * | 8/2010 | Huang et al. | 713/310 |
| 7,844,846 | B2 * | 11/2010 | Morrell | 713/340 |
| 2004/0210779 | A1 * | 10/2004 | Wang | 713/300 |
| 2006/0047987 | A1 * | 3/2006 | Prabhakaran et al. | 713/322 |
| 2006/0136770 | A1 * | 6/2006 | Jorgenson et al. | 713/500 |
| 2006/0220723 | A1 * | 10/2006 | Chen et al. | 327/291 |
| 2007/0088962 | A1 * | 4/2007 | Yu | 713/300 |
| 2007/0170963 | A1 | 7/2007 | Liang et al. | |
| 2009/0077402 | A1 * | 3/2009 | Huang et al. | 713/320 |
| 2009/0199033 | A1 * | 8/2009 | Borkar et al. | 713/340 |

FOREIGN PATENT DOCUMENTS

| | | |
|---|---|---|
| CN | 1851579 A | 10/2006 |
| TW | I276939 | 3/2007 |
| TW | 200727108 | 7/2007 |
| WO | 0135200 A1 | 5/2001 |

* cited by examiner

*Primary Examiner* — Ryan Stiglic
(74) *Attorney, Agent, or Firm* — Jianq Chyun IP Office

(57) ABSTRACT

A computer system capable of dynamically modulating an operation voltage and an operation frequency of a CPU comprises: a CPU from which a VID1 is outputted based on a real load of the CPU; a VID converting/comparing controller capable of determining to operate in an bypass mode or a calculation mode in response to the received VID1 signal and capable of outputting a VID2 signal and a control signal; a frequency generator for generating a CPU clock with a specific frequency to the CPU in response to the control signal; and a PWM controller capable of generating the operation voltage to the CPU in response to the VID2 signal; wherein when the VID converting/comparing controller is switched to operate in the calculation mode, the VID1 signal is not equal to the VID2 signal and the specific frequency is modulated to either a higher or a lower than a normal operation frequency by the VID converting/comparing controller.

7 Claims, 5 Drawing Sheets

COMPUTER SYSTEM CAPABLE OF DYNAMICALLY MODULATING OPERATION VOLTAGE AND FREQUENCY OF CPU

FIELD OF THE INVENTION

The present invention relates to a computer system capable of dynamically modulating the operation voltage and frequency of central processing unit (CPU), and more particularly to a computer system capable of dynamically modulating the operation voltage and frequency of CPU based on the load of the CPU.

BACKGROUND OF THE INVENTION

FIG. 1 is a functional block diagram depicting a conventional computer system providing operation voltage to a CPU. The computer system comprises a power supply 12, a PWM controller (pulse-width-modulation controller) 14, and a CPU 16 from which a VID (voltage identification) signal is outputted to the PWM controller 14, where the value of the VID signal is proportional to the load of the CPU 16. Because the power supply 12 and the PWM controller 14 must always provide enough power to the CPU, the PWM controller 14 must real-time modulates the operation voltage to the CPU 16 based on the real load of the CPU 16. That is, if the CPU 16 is operated in a relative-heavy load, the VID signal transmitted to the PWM controller 14 from the CPU 16 is accordingly relative large, so as the PWM controller 14 can modulate and output a relative-large operation voltage to the CPU 16 based on the relative-large VID signal. Similarly, if the CPU is operated in a relative-light load, the VID signal transmitted to the PWM controller 14 from the CPU 16 is accordingly relative small, so as the PWM controller 14 can modulate and output a relative-small operation voltage to the CPU 16 based on the relative-small VID signal.

The operation frequency of the CPU is also needed to be modulated according to the real load of the CPU, in other words, the operation frequency is needed to be increased if the load of the CPU is relative high, and, the operation frequency is needed to be decreased if the load of the CPU is relative low, where the operation frequency of the CPU is up to the HFM (highest-frequency mode) if the CPU is operated at a heaviest load; the operation frequency of the CPU is down to the LFM (lowest-frequency mode) if the CPU is operated at a lightest load.

However, the CPU is not necessarily restricted to operate between the HFM and the LFM. To get a better performance, the operation frequency of the CPU can be increased to higher than the HFM (for example, 10% or 20% higher than HFM), where the increasing of the operation frequency higher than the HFM is named overclocking. On the other hand, to get a better power saving, the operation frequency of the CPU can be decreased to lower than the LFM (for example, 10% or 20% lower than LFM), where the decreasing of the operation frequency lower than the LFM is named underclocking.

According to the specification of CPU, the operation voltage of the CPU must be increased first before the execution of the overclocking, where the increasing of the operation voltage can be named over-voltage. Similarly, the operation voltage of the CPU must be decreased first before the execution of the underclocking, where the decreasing of the operation voltage can be named under-voltage.

FIG. 2 is a functional block diagram depicting a conventional computer system capable of executing overclocking, underclocking, over-voltage, and under-voltage to a CPU. The computer system comprises a power supply 22, a PWM controller 24, a CPU 26, a control unit 28, a BIOS (basic-input-output-system) 30, a frequency generator 32, and an application program 34. The operation voltage can be increased via the BIOS 30. First, before the computer system entering to the operation system (OS), user can select a relative-high operation voltage from several operation voltages provided by a SETUP menu of the BIOS 30. After the relative-high operation voltage is selected, BIOS 30 then controls the control unit 28 to inform the PWM controller 24 to get ready to provide the selected relative-high operation voltage to the CPU 26. After the computer system entering to the operation system (OS), the selected relative-high operation voltage is then provided to the CPU 26, so as the over-voltage is done. After the over-voltage is done, user can execute the overclocking via the application program 32. First, user can select (or key-in) a relative-high operation frequency via the application program 34. After the relative-high operation frequency is selected (or key-in), the application program 34 then controls the BIOS 30 to inform the frequency generator 32 to generate the selected (or key-in) operation frequency ($CLK_{CPU}$) and then provide to the CPU 26, so as the overclocking is done.

Similarly, the operation voltage of the CPU must be decreased first before the execution of the underclocking. The under-voltage and underclocking can be done via the above-described procedures, so as no unnecessary detail descriptions are given here.

However, once the operation voltage is modulated and computer system is entered to the operation system (OS), the operation voltage cannot be modulated again unless user reboots the computer system to make the computer system enter to the operation system (OS) again. Because the operation voltage cannot be real-time modulated according to the load of CPU, the power waste may be happened if the operation voltage is modulated to relative high but actually the relative-high operation voltage is not necessary in the computer system. Similarly, the poor performance may be happened if the operation voltage is modulated to relative low but actually the relative-low operation voltage is not enough to the computer system.

SUMMARY OF THE INVENTION

Therefore, the purpose of the present invention is to provide a computer system capable of dynamically modulating the operation voltage and frequency of CPU based on the load of the CPU.

The invention provides a computer system capable of dynamically modulating an operation voltage and an operation frequency of a central processing unit, comprising: a central processing unit from which a first voltage identification signal is outputted based on a real load of the central processing unit; a voltage identification converting/comparing controller capable of determining to operate in an bypass mode or a calculation mode in response to the received first voltage identification signal and capable of outputting a second voltage identification signal and a control signal; a frequency generator for generating a central-processing-unit clock with a specific frequency to the central processing unit in response to the control signal; and a pulse-width-modulation controller capable of generating the operation voltage to the central processing unit in response to the second voltage identification signal; wherein when the voltage identification converting/comparing controller is switched to operate in the calculation mode, the first voltage identification signal is not equal to the second voltage identification signal and the specific frequency is modulated to either a higher or a lower than a normal operation frequency by the voltage identification converting/comparing controller.

The invention further provides a computer system capable of dynamically modulating an operation voltage of a central processing unit, comprising: a central processing unit from which a first voltage identification signal is outputted based on a real load of the central processing unit; a voltage identification converting/comparing controller capable of determining to operate in an bypass mode or a calculation mode in response to the received first voltage identification signal and capable of outputting a second voltage identification signal; and a pulse-width-modulation controller capable of generating the operation voltage to the central processing unit in response to the second voltage identification signal; wherein when the voltage identification converting/comparing controller is switched to operate in the calculation mode, the first voltage identification signal is not equal to the second voltage identification signal.

The present invention provides a computer system capable of dynamically modulating an operation frequency of a central processing unit, comprising: a central processing unit from which a first voltage identification signal is outputted based on a real load of the central processing unit; a voltage identification converting/comparing controller capable of determining to operate in an bypass mode or a calculation mode in response to the received first voltage identification signal and capable of outputting a control signal; and a frequency generator for generating a central-processing-unit clock with a specific frequency to the central processing unit in response to the control signal; wherein when the voltage identification converting/comparing controller is switched to operate in the bypass mode, the specific frequency is equal to a normal frequency; and when the voltage identification converting/comparing controller is switched to operate in the calculation mode, the specific frequency is modulated to either a higher or a lower than the normal operation frequency.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
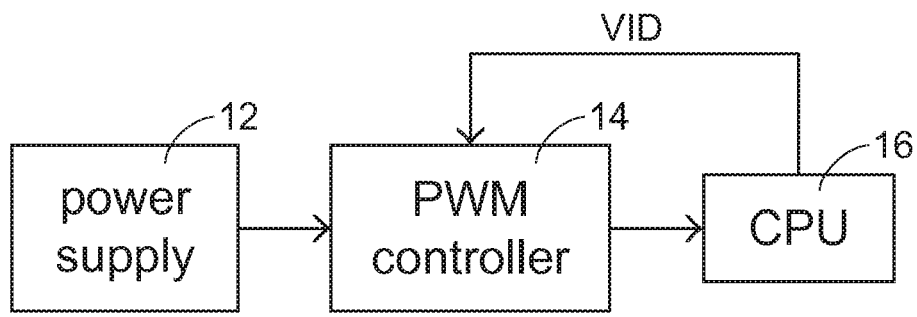
FIG. 1 is a functional block diagram illustrating a conventional computer system providing operation voltage to a CPU.
Figure 2:
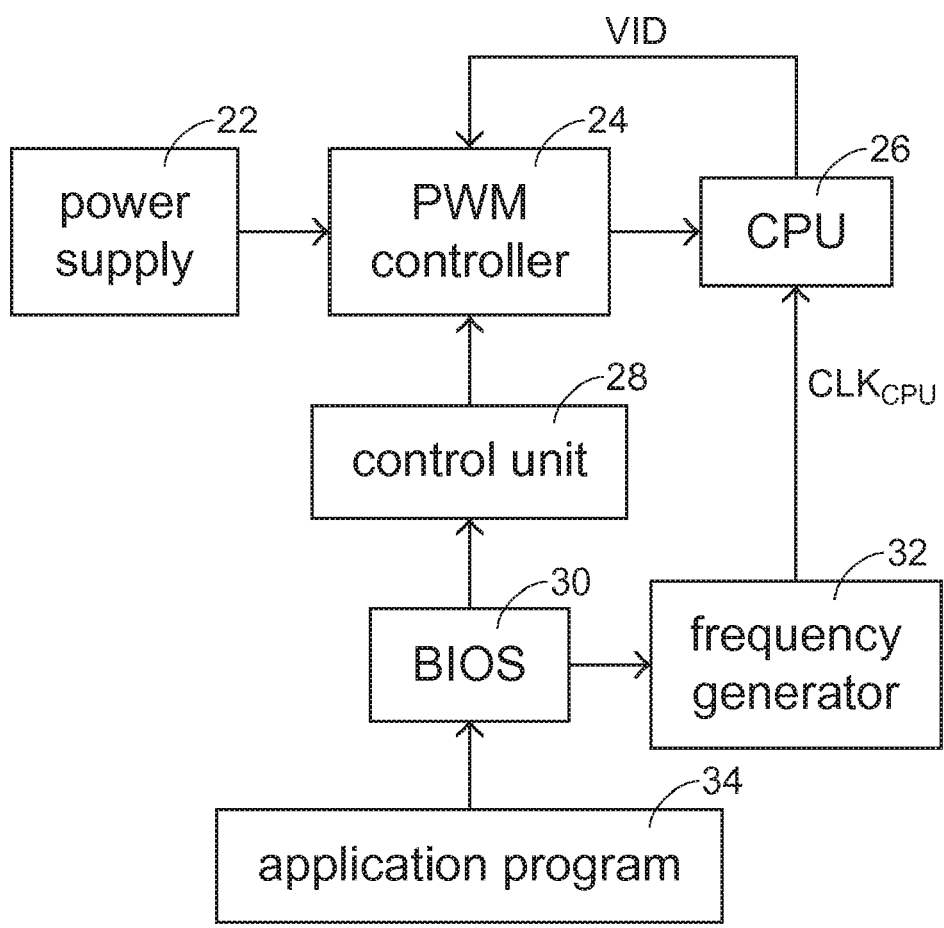
FIG. 2 is a functional block diagram illustrating a conventional computer system executing the overclocking, underclocking, over-voltage, and under-voltage to a CPU.
Figure 3A:
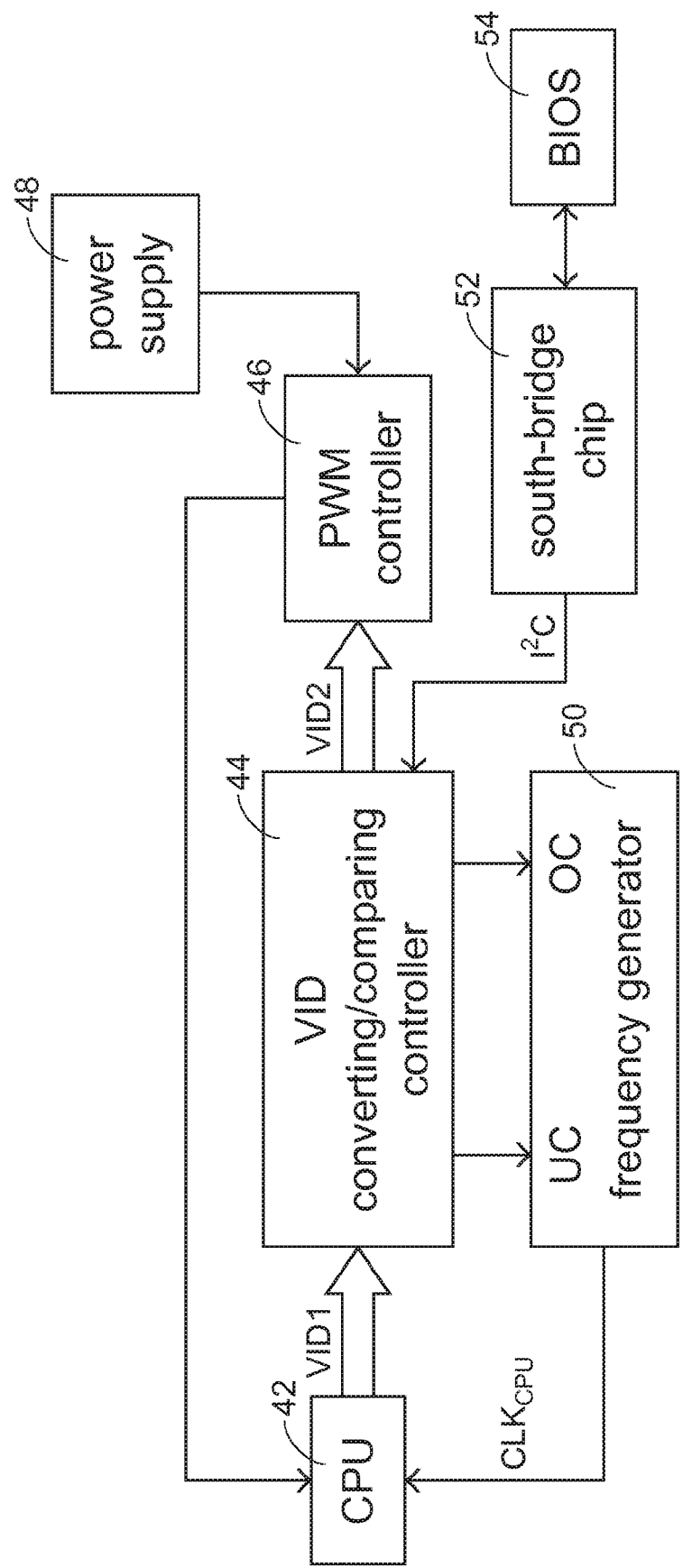
FIG. 3A is a functional block diagram illustrating the present invention of a computer system capable of dynamically modulating the operation voltage and operation frequency of CPU.

FIG. 3A is a functional block diagram depicting the present invention of a computer system capable of dynamically modulating the operation voltage and operation frequency of CPU. The computer system comprises a CPU 42, a VID converting/comparing controller 44, a PWM controller 46, a power supply 48, a frequency generator 50, a south-bridge chip 52, and a BIOS 54. The VID converting/comparing controller 44 is further installed with a maximum VID value ($VID_{max}$) and a minimum VID value ($VID_{min}$), where the maximum VID value ($VID_{max}$) stands for the value of VID signal when the CPU 42 is operated in the HFM (highest-frequency mode) and the minimum VID value ($VID_{min}$) stands for the value of VID signal when the CPU 42 is operated in the LFM (lowest-frequency mode). Moreover, via an $I^2C$ bus, the maximum VID value ($VID_{max}$) and the minimum VID value ($VID_{min}$) can be predefined in the registers of the VID converting/comparing controller 44 by the BIOS 54 when the computer system is boosting.

If the VID1 signal, outputted from the CPU 42, is detected in the range between the $VID_{max}$ and $VID_{min}$, the operation frequency of the CPU 42 is determined in the range between the HFM (highest-frequency mode) and the LFM (lowest-frequency mode), so as CPU 42 is determined to operate in a normal load. Because the CPU 42 is determined to operate in a normal load, there is no need to execute the overclocking or the underclocking to the CPU 42, so as the VID converting/comparing controller 44 is switched to operate in a bypass mode. If the VID converting/comparing controller 44 is operated in the bypass mode, the VID1 signal outputted from the CPU 42 will be directly transmitted to the PWM controller 46 (VID2=VID1). Then, the intensity of the operation voltage, outputted from the PWM controller 46 to the CPU 42, are completely based on the VID2 (VID2=VID1) without any modulation. That is, neither the over-voltage nor the under-voltage is executed to the CPU 42.

Moreover, if the VID converting/comparing controller 44 is operated in the bypass mode, a specific control signal, such as a low level, is outputted from the VID converting/comparing controller 44 to both the UC pin (under clocking) and OC pin (over clocking) of the frequency generator 50. Accordingly, a normal operation frequency ($CLK_{CPU}$) is generated by the frequency generator 50 and then outputted to the CPU 42. That is, neither the overclocking nor the underclocking is executed to the CPU 42.

If the VID1 is detected up to the $VID_{max}$, the operation frequency of the CPU 42 is determined in the HFM (highest-frequency mode), so as CPU 42 is determined to operate in a heavy load. Because the CPU 42 is determined to operate in a heavy load, the operation voltage and the operation frequency of the CPU 42 are necessary to increase, so as the VID converting/comparing controller 44 is switched to operate in a calculation mode. If the VID converting/comparing controller 44 is operated in the calculation mode due to the VID1 is detected up to the $VID_{max}$, a positive offset is firstly applied to the VID1 by the VID converting/comparing controller 44 and then the VID2 is outputted to the PWM controller 46 (VID2=VID1+offset), so as the increasing of the operation voltage (over-voltage) is done. Then, a specific control signal, such as a high level, is outputted from the VID converting/comparing controller 44 to the OC pin (over clocking) of the frequency generator 50. Accordingly, a higher operation frequency (higher than the normal operation frequency) is generated by the frequency generator 50 and then outputted to the CPU 42, so as the overclocking is done.

If the VID1 is detected down to the $VID_{min}$, the operation frequency of the CPU 42 is determined in the LFM (lowest-frequency mode), so as CPU 42 is determined to operate in a light load. Because the CPU 42 is determined to operate in a light load, the operation voltage and the operation frequency of the CPU 42 are necessary to decrease, so as the VID converting/comparing controller 44 is switched to operate in the calculation mode. If the VID converting/comparing controller 44 is operated in the calculation mode due to the VID1 is detected down to the $VID_{min}$, a negative offset is firstly applied to the VID1 by the VID converting/comparing controller 44 and then the VID2 is outputted to the PWM controller 46 (VID2=VID1−offset), so as the decreasing of the operation voltage (under-voltage) is done. Then, a specific control signal, such as a high level, is outputted from the VID converting/comparing controller 44 to the UC pin (under clocking) of the frequency generator 50. Accordingly, a lower operation frequency (lower than the normal operation frequency) is generated by the frequency generator 50 and then outputted to the CPU 42, so as the underclocking is done.

Figure 3B:
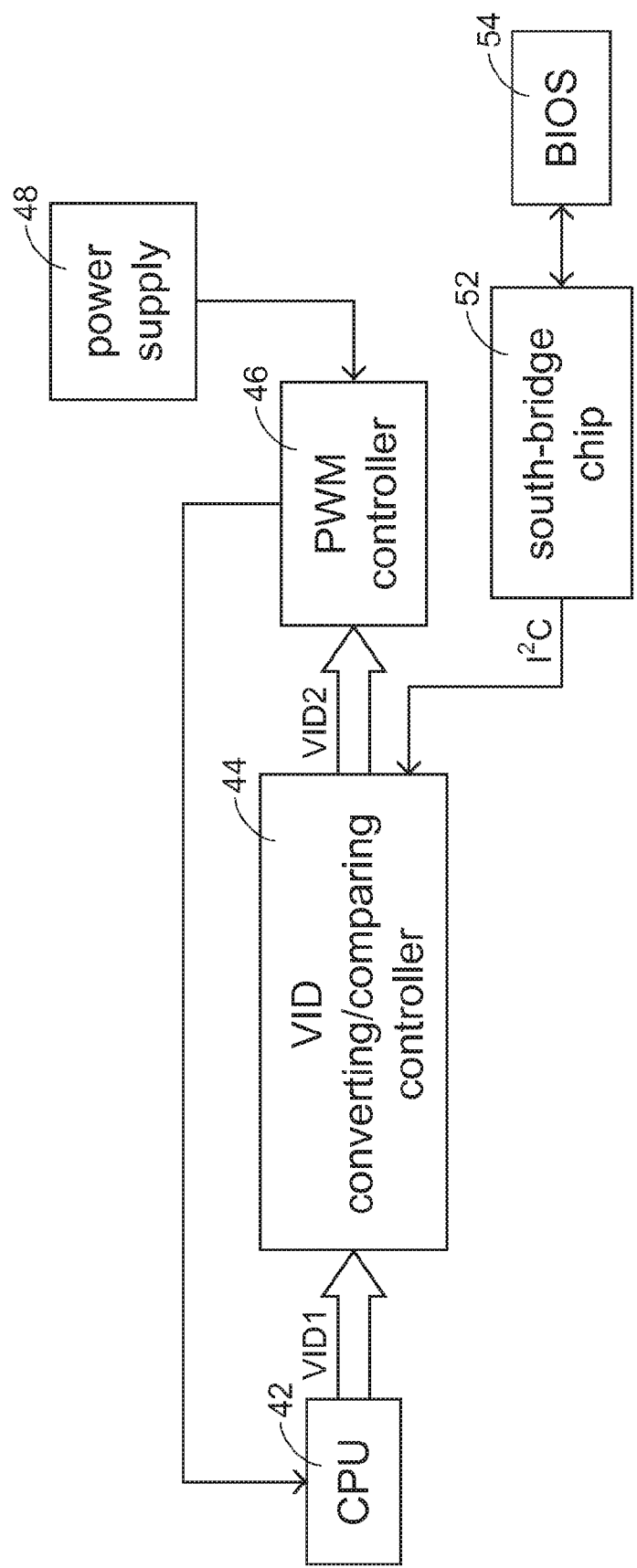
FIG. 3B is a functional block diagram illustrating the present invention of a computer system capable of dynamically modulating the operation voltage of CPU.

Moreover, the operation voltage and the operation frequency can be independently modulated in the present invention. FIG. 3B is a functional block diagram depicting the present invention of a computer system capable of dynamically modulating the operation voltage of CPU.

If the VID1 is detected in the range between the $VID_{max}$ and $VID_{min}$, the operation frequency of the CPU 42 is determined in the range between HFM (highest-frequency mode) and LFM (lowest-frequency mode), so as CPU 42 is determined to operate in a normal load. Because the CPU 42 is determined to operate in a normal load, the VID converting/comparing controller 44 is switched to operate in the bypass mode. Then, the VID1 outputted from the CPU 42 is directly transmitted to the PWM controller 46 (VID2=VID1), so as no any modulation to the operation voltage outputted from the PWM controller 46 to the CPU 42.

If the VID1 is detected up to the $VID_{max}$, the CPU 42 is determined to operate in a heavy load, so as the VID converting/comparing controller 44 is switched to operate in the calculation mode. When the VID converting/comparing controller 44 is switched to operate in the calculation mode, a positive or a negative offset is firstly applied to the received VID1 according to a specific mechanism, and then the modulated VID2 (VID2=VID1+offset, or, VID2=VID1−offset,) is outputted to the PWM controller 46.

If the VID1 is detected down to the $VID_{min}$, the CPU 42 is determined to operate in a light load, so as the VID converting/comparing controller 44 is switched to operate in the calculation mode. When the VID converting/comparing controller 44 is switched to operate in the calculation mode, a positive or a negative offset is firstly applied to the received VID1 according to a specific mechanism, and then the modulated VID2 (VID2=VID1+offset, or, VID2=VID1−offset,) is outputted to the PWM controller 46.

Figure 3C:
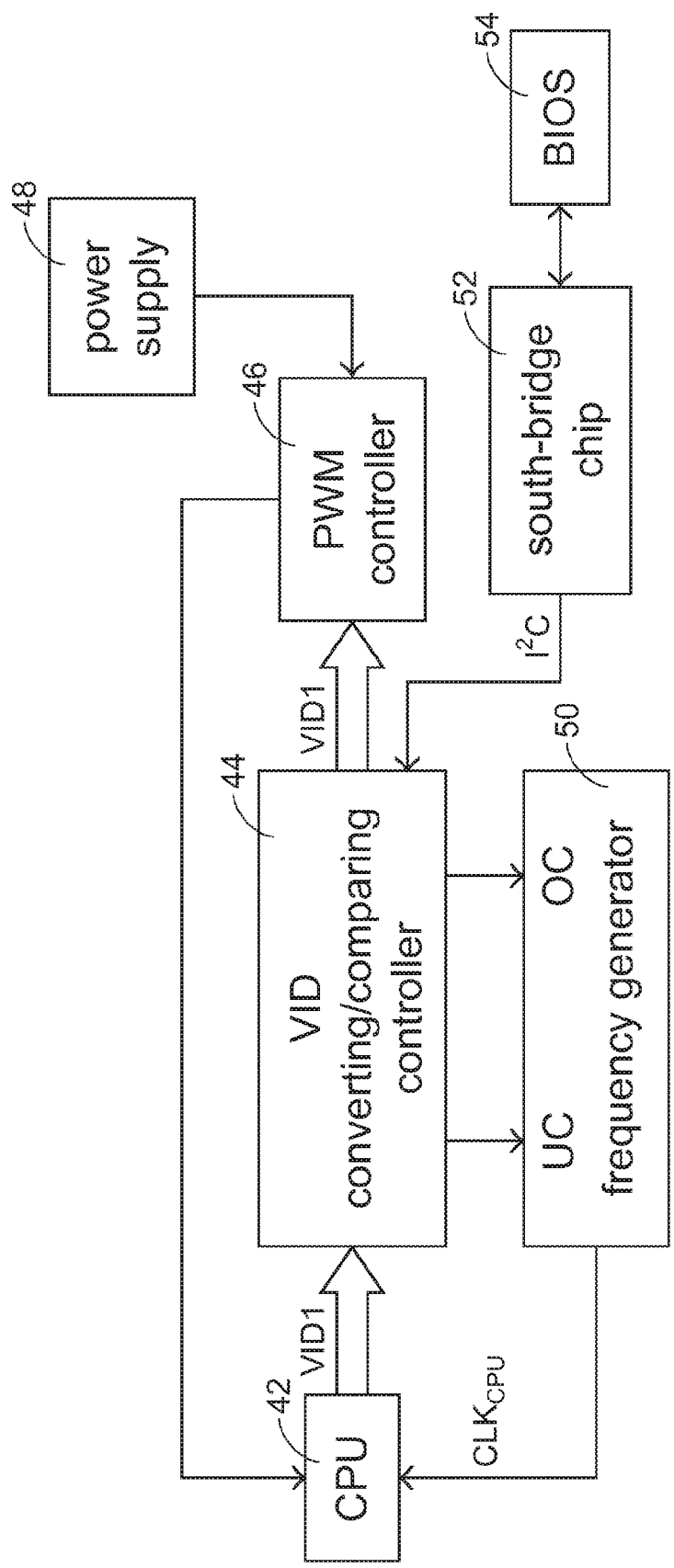
FIG. 3C is a functional block diagram illustrating the present invention of a computer system capable of dynamically modulating the operation frequency of CPU.

FIG. 3C is a functional block diagram depicting the present invention of a computer system capable of dynamically modulating the operation frequency of CPU. Because FIG. 3C only depicts the modulation of the operation frequency, the VID1, outputted from the CPU 42, is always directly transmitted to the PWM controller 46 by the VID converting/comparing controller 44 no matter the VID converting/comparing controller 44 is operated in the bypass mode or the calculation mode. If the VID1 is detected in the range between the $VID_{max}$ and $VID_{min}$, the operation frequency of the CPU 42 is determined in the range between HFM (highest-frequency mode) and LFM (lowest-frequency mode), so as CPU 42 is determined to operate in a normal load. Because the CPU 42 is determined to operate in a normal load, the VID converting/comparing controller 44 is switched to operate in the bypass mode. Then, a specific control signal, such as a low level, is outputted from the VID converting/comparing controller 44 to the UC pin (under clocking) and OC pin (over clocking) of the frequency generator 50. Accordingly, a normal operation frequency is generated by the frequency generator 50 and then outputted to the CPU 42.

If the VID1 is detected up to the $VID_{max}$, the operation frequency of the CPU 42 is determined in the HFM (highest-frequency mode), so as CPU 42 is determined to operate in a heavy load. Because the CPU 42 is determined to operate in a heavy load so as the operation frequency of the CPU 42 is necessary to increase, the VID converting/comparing controller 44 is switched to operate in the calculation mode. Then, a specific control signal, such as a high level, is outputted from the VID converting/comparing controller 44 to the OC pin (over clocking) of the frequency generator 50. Accordingly, a higher operation frequency (higher than the normal operation frequency) is generated by the frequency generator 50 and then outputted to the CPU 42, so as the overclocking is done.

Similarly, if the VID1 is detected down to the $VID_{min}$, the operation frequency of the CPU 42 is determined in the LFM (lowest-frequency mode), so as CPU 42 is determined to operate in a light load. Because the CPU 42 is determined to operate in a light load so as the operation frequency of the CPU 42 is necessary to decrease, the VID converting/comparing controller 44 is switched to operate in the calculation mode. Then, a specific control signal, such as a high level, is outputted from the VID converting/comparing controller 44 to the UC pin (under clocking) of the frequency generator 50. Accordingly, a lower operation frequency (lower than the normal operation frequency) is generated by the frequency generator 50 and then outputted to the CPU 42, so as the underclocking is done.

Figure 4A:
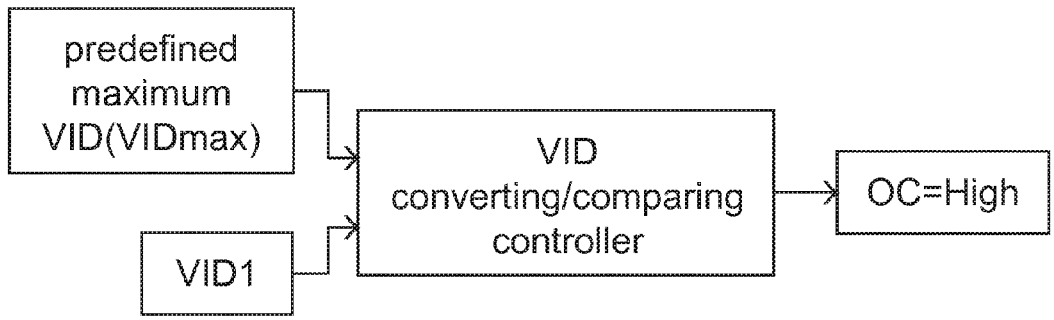
FIG. 4A is a diagram illustrating the VID converting/comparing controller adopted in the present invention automatically executing the overclocking to the CPU.

FIG. 4A is a diagram illustrating the VID converting/comparing controller adopted in the present invention automatically executing the overclocking to the CPU. After the VID1 signal, outputted from the CPU, is compared with the predefined maximum VID ($VID_{max}$), the VID converting/comparing controller is switched to operate in the calculation mode if VID1 is up to the $VID_{max}$. Then, a high level is outputted from the VID converting/comparing controller to the OC pin (over clocking) of the frequency generator.

Figure 4B:
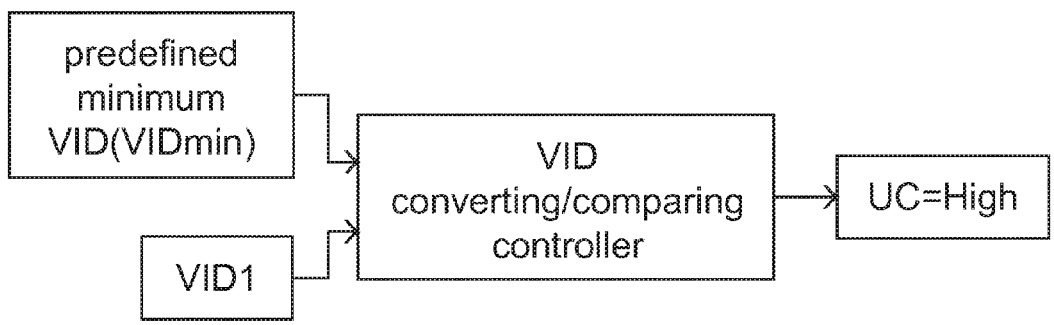
FIG. 4B is a diagram illustrating the VID converting/comparing controller adopted in the present invention automatically executing the underclocking to the CPU.

FIG. 4B is a diagram illustrating the VID converting/comparing controller adopted in the present invention automatically executing the unerclcoking to the CPU. After the VID1 signal, outputted from the CPU, is compared with the predefined minimum VID ($VID_{min}$), the VID converting/comparing controller is switched to operate in the calculation mode if VID1 is down to the $VID_{min}$. Then, a high level is outputted from the VID converting/comparing controller to the UC pin (under clocking) of the frequency generator. Moreover, the VID converting/comparing controller in FIGS. 4A and 4B can be used as the VID converting/comparing controller adopted in FIG. 3A and FIG. 3C.

Figure 5:
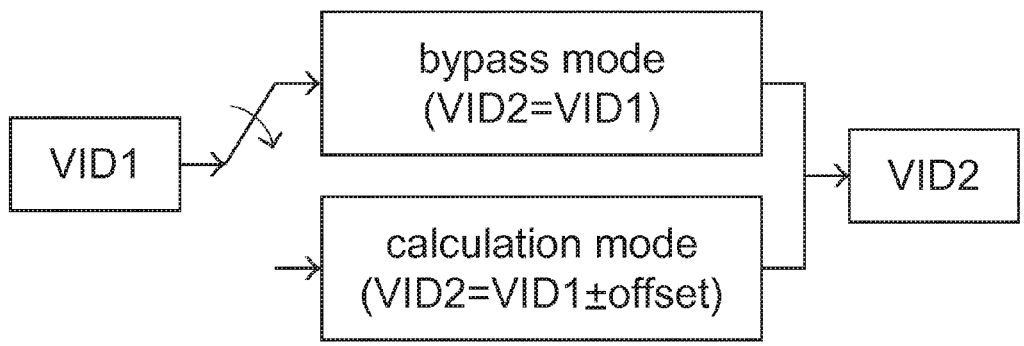
FIG. 5 is a diagram illustrating the VID converting/comparing controller adopted in the present invention is switched to either a bypass mode or a calculation mode.

FIG. 5 is a diagram illustrating the VID converting/comparing controller adopted in the present invention automatically executing the over-voltage/under-voltage to a CPU. After the VID1 signal, outputted from the CPU, is compared with both the predefined maximum VID ($VID_{max}$) and the predefined minimum VID ($VID_{min}$), the VID converting/comparing controller is switched to operate in the bypass mode if VID1 is in the range between $VID_{max}$ and $VID_{min}$. Because the VID converting/comparing controller is switched to operate in the bypass mode, the VID1 inputted to the VID converting/comparing controller will be directly transmitted to the PWM controller (VID2=VID1). Or, the VID converting/comparing controller is switched to operate in the calculation mode if VID1 is up to $VID_{max}$ or down to $VID_{min}$. Because the VID converting/comparing controller is switched to operate in the calculation mode, the VID1 inputted to the VID converting/comparing controller will be added to an offset or subtracted by an offset (VID2=VID1+offset or VID2=VID1−offset) and then outputted to the PWM controller. Moreover, the VID converting/comparing controller in FIG. 5 can be used as the VID converting/comparing controller adopted in FIG. 3A and FIG. 3B.

To sum up, the operation voltage and the operation frequency of the CPU can be dynamically modulated based on the real load of the CPU in the present invention. Moreover, the modulation of the operation voltage in the invention can be done without via the BIOS; accordingly the overclocking, underclocking, over-voltage, or under-voltage can be done efficiently. Moreover, before executing the overclocking or the underclocking, the operation voltage can be flexibly modulated based on some specific requirements, such as the performance or power saving.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer system capable of dynamically overclocking or underclocking of a central processing unit, comprising:
   a central processing unit from which a first voltage identification signal is outputted based on a real load of the central processing unit;
   a voltage identification converting/comparing controller capable of determining to operate in an bypass mode or a calculation mode in response to the received first voltage identification signal and capable of outputting a second voltage identification signal and a control signal, wherein a predefined maximum voltage identification value and a predefined minimum voltage identification value are installed in the voltage identification converting/comparing controller;
   a frequency generator for generating a central-processing-unit clock with a specific frequency to the central processing unit in response to the control signal; and
   a pulse-width-modulation controller capable of generating the operation voltage to the central processing unit in response to the second voltage identification signal,
   wherein the voltage identification converting/comparing controller is switched to operate in the calculation mode if the first voltage identification signal is up to the predefined maximum voltage identification value or down to the predefined minimum voltage identification value, and the first voltage identification signal is not equal to the second voltage identification signal, the voltage identification converting/comparing controller executes overclocking or underclocking to the central processing unit,
   wherein the voltage identification converting/comparing controller is switched to operate in the bypass mode if the first voltage identification signal is less than the predefined maximum voltage identification value and greater than the predefined minimum voltage identification value, and the second voltage identification signal is equal to the first voltage identification signal, the voltage identification converting/comparing controller is without executing overclocking or underclocking to the central processing unit.

2. A computer system capable of dynamically modulating an operation voltage and an operation frequency of a central processing unit, comprising:
   a central processing unit from which a first voltage identification signal is outputted based on a real load of the central processing unit;
   a voltage identification converting/comparing controller capable of determining to operate in an bypass mode or a calculation mode in response to the received first voltage identification signal and capable of outputting a second voltage identification signal and a control signal, wherein a predefined maximum voltage identification value and a predefined minimum voltage identification value are installed in the voltage identification converting/comparing controller;
   a frequency generator for generating a central-processing-unit clock with a specific frequency to the central processing unit in response to the control signal; and
   a pulse-width-modulation controller capable of generating the operation voltage to the central processing unit in response to the second voltage identification signal,
   wherein the voltage identification converting/comparing controller is switched to operate in the calculation mode if the first voltage identification signal is up to the predefined maximum voltage identification value or down to the predefined minimum voltage identification value, when the voltage identification converting/comparing controller is operated in the calculation mode, the first voltage identification signal is not equal to the second voltage identification signal, and the specific frequency and the operation voltage are increased/decreased in order to execute overclocking/underclocking and over-voltage/under-voltage to the central processing unit,
   wherein the voltage identification converting/comparing controller is switched to operate in the bypass mode if the first voltage identification signal is less than the predefined maximum voltage identification value and greater than the predefined minimum voltage identification value, when the voltage identification converting/comparing controller is operated in the bypass mode, the second voltage identification signal is equal to the first voltage identification signal, the specific frequency is equal to a normal operation frequency and the operation voltage is equal to a normal operation voltage without executing overclocking/underclocking and over-voltage/under-voltage to the central processing unit.

3. The computer system capable of dynamically modulating an operation voltage and an operation frequency of a central processing unit according to claim 1, wherein the predefined maximum voltage identification value and the predefined minimum voltage identification value are installed in a register of the voltage identification converting/comparing controller via a basic-input-output-system when the computer system is boosting.

4. The computer system capable of dynamically modulating an operation voltage and an operation frequency of a central processing unit according to claim 1, wherein the second voltage identification signal is equal to the first voltage identification signal added by an offset and the specific frequency is modulated to the higher frequency if the first voltage identification signal is up to the predefined maximum voltage identification value; and the second voltage identification signal is equal to the first voltage identification signal subtracted by the offset and the specific frequency is modulated to the lower frequency if the first voltage identification signal is down to the predefined minimum voltage identification value.

5. The computer system capable of dynamically modulating an operation voltage and an operation frequency of a central processing unit according to claim 1, wherein the frequency generator further comprises an overclocking pin and an underclocking pin for receiving the control signal.

6. The computer system capable of dynamically modulating an operation voltage and an operation frequency of a central processing unit according to claim 1, wherein the normal operation frequency is between a first frequency when the first voltage identification signal is equal to the predefined maximum voltage identification value and a second frequency when the first voltage identification signal is equal to the predefined minimum voltage identification value; and the specific frequency is higher than the first frequency or lower than the second frequency.

7. The computer system capable of dynamically modulating an operation voltage and an operation frequency of a central processing unit according to claim 1, further comprising a power supply, a south-bridge chip, and a basic-input-output-system, wherein the power supply is connected to the pulse-width-modulation, the south-bridge chip is connected between the basic-input-output-system and the voltage identification converting/comparing controller.

* * * * *